(12) United States Patent
Mgaya et al.

(10) Patent No.: US 7,687,551 B2
(45) Date of Patent: Mar. 30, 2010

(54) DUAL CURE ADHESIVES

(75) Inventors: Alexander P. Mgaya, Cary, NC (US); Balasubramaniam Ramalingam, Cary, NC (US)

(73) Assignee: Henkel Corporation, Rocky Hill, CT (US)

( * ) Notice: Subject to any disclaimer, the term of this patent is extended or adjusted under 35 U.S.C. 154(b) by 124 days.

(21) Appl. No.: 11/470,457

(22) Filed: Sep. 6, 2006

(65) Prior Publication Data

US 2007/0039688 A1 Feb. 22, 2007

Related U.S. Application Data

(63) Continuation-in-part of application No. 11/195,291, filed on Aug. 2, 2005, now abandoned.

(60) Provisional application No. 60/793,897, filed on Apr. 21, 2006.

(51) Int. Cl.
C08F 2/46 (2006.01)
C08J 3/28 (2006.01)
C09J 4/06 (2006.01)

(52) U.S. Cl. .............................. 522/86; 522/84; 522/85; 522/90; 522/96; 522/109; 522/110; 522/111; 522/112; 522/113; 522/116; 522/117; 522/120; 522/121; 522/150; 522/151; 522/153; 522/154; 522/173; 522/174; 522/178; 427/507; 427/517; 427/207.1; 156/60; 156/325; 156/326; 156/327; 156/331.1; 156/330.9; 156/331.2

(58) Field of Classification Search .................. 522/84, 522/85, 86, 90, 96, 109, 110, 111, 112, 113, 522/116, 117, 120, 121, 150.151, 152, 153, 522/154, 173, 174, 178; 427/508, 517, 207.1; 156/60, 325, 326, 327, 331.1, 330.9, 331.2
See application file for complete search history.

(56) References Cited

U.S. PATENT DOCUMENTS

| | | | |
|---|---|---|---|
| 2,158,233 A | 5/1939 | Gray | |
| 2,209,348 A | 7/1940 | Novick | |
| 2,588,543 A | 3/1952 | Kunze et al. | |
| 2,595,952 A | 5/1952 | Kunze et al. | |
| 2,986,976 A | 6/1961 | Novick | |
| 2,996,962 A | 8/1961 | Winkler | |
| 3,273,702 A | 9/1966 | Palmer | |
| 3,292,513 A | 12/1966 | Palmer | |
| 3,400,641 A | 9/1968 | Stemmler | |
| 3,408,908 A | 11/1968 | Berkowitz | |
| 3,412,655 A | 11/1968 | Kranz | |
| 3,416,414 A | 12/1968 | Smithe | |
| 3,431,830 A | 3/1969 | Stovall | |
| 3,468,227 A | 9/1969 | Volks et al. | |
| 3,572,222 A | 3/1971 | Sauerman | |
| 3,618,483 A | 11/1971 | Helm | |
| 3,630,124 A | 12/1971 | Sauerman | |
| 3,676,398 A | 7/1972 | D'Alelio | |
| 3,700,643 A | 10/1972 | Smith et al. | |
| 3,745,893 A | 7/1973 | Helm et al. | |
| 3,770,602 A | 11/1973 | D'Alelio | |
| 3,778,399 A | 12/1973 | Fazioli et al. | |
| 3,869,965 A | 3/1975 | Howatt | |
| 3,925,289 A | 12/1975 | Sakato et al. | |
| 4,018,851 A | 4/1977 | Baccei | |
| 4,061,527 A | 12/1977 | Traise | |
| 4,072,529 A | 2/1978 | Hoornstra et al. | |
| 4,092,376 A | 5/1978 | Douek et al. | |
| 4,113,540 A | 9/1978 | Patella et al. | |
| 4,133,723 A | 1/1979 | Howard | |
| 4,188,455 A | 2/1980 | Howard | |
| 4,206,025 A | 6/1980 | Vrancken et al. | |
| 4,295,909 A | 10/1981 | Baccei | |
| 4,309,526 A | 1/1982 | Baccei | |
| 4,380,613 A | 4/1983 | Nativi | |
| 4,396,739 A | 8/1983 | Sirota et al. | |
| 4,439,600 A | 3/1984 | Moran, Jr. | |
| 4,511,732 A | 4/1985 | Hicks | |
| 4,574,138 A | 3/1986 | Moran, Jr. et al. | |
| 4,642,085 A | 2/1987 | Helm | |
| 4,652,274 A | 3/1987 | Boettcher | |
| 4,664,648 A | 5/1987 | Dupuy | |
| 4,733,916 A | 3/1988 | Seufert | |
| 4,826,004 A | 5/1989 | Dupuy | |

(Continued)

FOREIGN PATENT DOCUMENTS

AU 199743013 4/1998

(Continued)

OTHER PUBLICATIONS

XP-002406487, Derwent Publications Ltd 2005-54180.

*Primary Examiner*—Sanza L McClendon
(74) *Attorney, Agent, or Firm*—Sun Lee Lehmann

(57) ABSTRACT

Adhesive compositions useful for laminating cellulosic substrates are formulated using an aqueous emulsion of a vinyl ester polymer such as polyvinyl acetate, one or more monomers or oligomers functionalized with (meth)acrylate groups, and a photoinitiator. The adhesive is cured by drying and exposing the adhesive to UV or visible light and is particularly useful for attaching clear films to cellulosic substrates such as paper and boxboard (e.g., in the manufacture of envelopes or folding cartons having windows).

16 Claims, No Drawings

U.S. PATENT DOCUMENTS

| | | |
|---|---|---|
| 4,838,982 A | 6/1989 | Klaeser et al. |
| 4,846,775 A | 7/1989 | Herrin |
| 4,935,454 A | 6/1990 | Koblitz et al. |
| 5,002,976 A | 3/1991 | McConnell et al. |
| 5,160,083 A | 11/1992 | Lafreniere |
| 5,543,557 A | 8/1996 | Bergvall |
| 5,571,860 A | 11/1996 | Kukkala et al. |
| 5,640,831 A | 6/1997 | Harrod et al. |
| 5,648,143 A | 7/1997 | Mehta et al. |
| 5,739,232 A | 4/1998 | Hazell et al. |
| 5,849,813 A | 12/1998 | Oxman |
| 5,900,473 A | 5/1999 | Acevedo et al. |
| 6,407,195 B2 | 6/2002 | Sherman et al. |
| 2003/0083397 A1 | 5/2003 | Bradford et al. |
| 2004/0127594 A1 | 7/2004 | Yang et al. |
| 2004/0168762 A1 | 9/2004 | Fricke et al. |
| 2004/0180226 A1 | 9/2004 | Chatterjee et al. |
| 2005/0065310 A1 | 3/2005 | Wang et al. |

FOREIGN PATENT DOCUMENTS

| | | |
|---|---|---|
| EP | 930350 | 7/1999 |
| GB | 2119810 A | 11/1983 |
| WO | WO 2005/058990 | 6/2005 |

DUAL CURE ADHESIVES

CROSS-REFERENCE TO RELATED APPLICATIONS

This application is a continuation-in-part of application Ser. No. 11/195,291, filed Aug. 2, 2005, now abandoned which is incorporated herein by reference in its entirety, and also claims priority of U.S. Provisional Application 60/793,897, filed Apr. 21, 2006, incorporated herein by reference in its entirety.

FIELD OF THE INVENTION

The invention relates to water-based adhesives capable of being cured through at least two mechanisms. One component of the adhesive is an emulsion of a vinyl ester homopolymer or copolymer, while another component contains one or more (meth)acrylate-functionalized monomers and/or oligomers capable of being polymerized and/or crosslinked by exposure to ultraviolet or visible light. The adhesives are particularly useful for bonding cellulosic substrates to films such as the transparent films used to create envelope or folding carton windows.

BACKGROUND OF THE INVENTION

Adhesives based on emulsions of vinyl acetate polymers have been known for many years and are commonly employed for purposes of bonding paper and other cellulosic substrates. For example, polyvinyl acetate adhesives are used in bookbinding, carton sealing, boxboard manufacture, bag seaming, tube winding, cup adhesives, remoistenable adhesives on labels, stamps and envelopes, and for bonding various films to cellulosic materials. However, one problem encountered in the last-named application is that polyvinyl acetate emulsion adhesives often cause warping or wrinkling in the laminate formed when a film is bonded to paper. The fabrication of envelopes containing clear windows of a polymeric or glassine film that are smooth and free of wrinkles thus can be difficult when using such adhesives. Eliminating this problem is challenging since any adhesive used for such purpose also must not leach through the paper, must have a viscosity which can be maintained within a workable range during processing and manufacture of the laminate, must exhibit sufficient immediate adhesion to avoid warping and wrinkling during the lamination process, and must provide sufficient adhesion when set or cured to avoid delamination of the layers during normal use. It would additionally be desirable for the adhesive to achieve instantaneous higher green tack than is attained with conventional water-borne polyvinyl acetate adhesives.

SUMMARY OF THE INVENTION

The present invention provides an adhesive capable of fulfilling one or more of the above-stated objectives, wherein said adhesive comprises a water-based emulsion of at least one vinyl ester homopolymer or copolymer, at least one (meth)acrylate-functionalized monomer and/or oligomer capable of being polymerized and/or crosslinked by exposure to ultraviolet or visible light, and at least one photoinitiator. A cellulosic substrate/film laminate may be produced by laminating a cellulosic substrate to a film using the aforedescribed adhesive and exposing said adhesive to an amount of visible and/or ultraviolet light effective to induce polymerization and/or crosslinking of the (meth)acrylate-functionalized monomer and/or oligomer. Complete curing of the adhesive layer is realized by drying of the vinyl ester homopolymer or copolymer emulsion.

DETAILED DESCRIPTION OF CERTAIN EMBODIMENTS OF THE INVENTION

The term "(meth)acrylate" is used herein to mean a functional group, moiety or substituent which may be an acrylate and/or a methacrylate.

The first component (a) of the adhesive compositions of the present invention comprises an emulsion in water of one or more vinyl ester homopolymers and/or copolymers. The vinyl ester monomer(s) utilized in the preparation of such homopolymer or copolymer may be an ester of an alkanoic acid containing from one to about 12 carbon atoms. Typical examples include, but are not limited to, vinyl formate, vinyl acetate, vinyl propionate, vinyl butyrate, vinyl isobutyrate, vinyl valerate, vinyl 2-ethyl-hexanoate, vinyl isoctanoate, vinyl nonoate, vinyl decanoate, vinyl pivalate, vinyl versatate, and the like. Of these, vinyl acetate is generally preferred because of its ready availability and low cost.

The vinyl ester monomer may be homopolymerized or copolymerized with one or more monomers other than a vinyl ester monomer. Suitable comonomers include, for instance, alpha olefins such as ethylene and $C_1$-$C_9$ esters of mono- and dicarboxylic acids containing at least one carbon-carbon double bond such as acrylic acid, methacrylic acid, fumaric acid and maleic acid. Examples of suitable comonomers of the latter type include 2-ethyl hexyl acrylate and dibutyl maleate. N-methylol comonomers such as N-methylolacrylamide may also be used, as can vinyl monomers such as N-vinyl formamide and N-vinyl pyrrolidone.

Emulsions of both vinyl ester homopolymers and copolymers suitable for use in the present adhesive compositions can be prepared by methods well known in the art. For instance, the polymerization of the aforementioned monomers can be carried out by means of free radical initiated polymerization wherein the monomer(s) is/are heated in the presence of a free radical initiator such as azobisisobutyronitrile or benzoyl peroxide. This polymerization is generally conducted in an aqueous medium, with the monomer(s) being emulsified therein. Emulsifiers and/or protective colloids such as polyvinyl alcohol or hydroxy-alkylated polysaccharides are often utilized. Typically, the emulsion of vinyl acetate polymer thereby obtained will have a solids content of from about 50 to about 80% by weight.

Vinyl acetate homopolymers are utilized in one particular embodiment of the invention. In certain embodiments, the vinyl ester polymer is neither cross-linked nor capable of being crosslinked by reaction with another component (i.e., the vinyl ester polymer is preferably essentially free of functional groups such as carboxylic acid groups that can react with crosslinking agents such as phenolic resoles, phenol formaldehyde adducts, phenol melamine formaldehyde resins, or water soluble zirconium salts and/or preferably essentially free of carbon-carbon double bonds capable of being reacted or crosslinked upon exposure to UV or visible light). The adhesive compositions of the present invention are "one component" in nature, i.e., when the adhesive is to be used, no further components, curing agents, or catalysts need to be combined with the adhesive in order to make the adhesive suitable for use. Thus, in preferred embodiments of the invention, the adhesive composition when used is free or essentially free of externally added cross-linking components capable of chemical reaction in the absence of visible or UV light such as triazine, urea-formaldehyde resins, melamine resins, acid rosinates, and the like.

Component a) (the vinyl ester polymer emulsion) will typically comprise the majority by weight of the adhesive compositions of the present invention. Although the concentration of component a) is not thought to be especially critical, generally speaking the emulsion will comprise from about 70 to about 95 percent by weight of the adhesive composition.

The dual cure adhesives of the present invention additionally contain at least one (meth)acrylate-functionalized monomer and/or oligomer capable of being polymerized and/or crosslinked by exposure to ultraviolet or visible light. Preferably, the monomer(s) and/or oligomer(s) used are water-soluble. To increase water solubility, such monomers and oligomers may be substituted with one or more polar groups per molecule such as, for example, hydroxy groups, carboxylic acid (or carboxylic acid salt) groups, ether groups, and the like.

The second component (b) of the adhesive compositions of the present invention may comprise one or more radiation curable (meth)acrylate-functionalized oligomers. These are oligomeric substances of low to moderate molecular weight (e.g., from about 300 to about 10,000 number average molecular weight) having one or more acrylate and/or methacrylate groups attached to the oligomeric backbone. The (meth)acrylate functional groups may be in a terminal position on the oligomer and/or may be distributed along the oligomeric backbone. In one embodiment of the invention, at least a portion of the (meth)acrylated functionalized oligomers have two or more (meth)acrylate functional groups per molecule. Examples of such oligomers include (meth)acrylate-functionalized urethane oligomers such as (meth)acrylate-functionalized polyester urethanes and (meth)acrylate-functionalized polyether urethanes, (meth)acrylate-functionalized polyepoxide resins, (meth)acrylate-functionalized polybutadienes, (meth)acrylic polyol (meth)acrylates, polyester(meth)acrylate oligomers, polyamide (meth)acrylate oligomers, polyether(meth)acrylate oligomers and the like. Such (meth)acrylate-functionalized oligomers and their methods of preparation are disclosed in, for example, U.S. Pat. Nos. 4,574,138; 4,439,600; 4,380,613; 4,309,526; 4,295,909; 4,018,851, 3,676,398; 3,770,602; 4,072,529; 4,511,732; 3,700,643; 4,133,723; 4,188,455; 4,206,025; 5,002,976; and published U.S. applications 2004/0127594 and 2005/0065310. Such materials are available from numerous commercial sources, including the UVITHANE resins from Morton International, certain oligomers sold under the brand name PHOTOMER by Cognis Corporation, the CN oligomer resins from Sartomer Company, the GENOMER resins from Rahn Inc., and the EBECRYL resins from the Cytec Surface Specialties Division of Cytec Industries, Inc.

Suitable (meth)acrylate-functionalized monomers which may form all or part of component (b) include monomers having single (meth)acrylate groups such as tetrahydrofurfuryl(meth)acrylate, hydroxyethyl(meth)acrylate, hydroxypropyl(meth)acrylate, isobornyl(meth)acrylate, methyl(meth)acrylate, ethyl(meth)acrylate, isopropyl(meth)acrylate, isooctyl(meth)acrylate, octyl(meth)acrylate, decyl(meth)acrylate, (meth)acrylic acid, n-hexyl(meth)acrylate, stearyl (meth)acrylate, allyl(meth)acrylate, 2(2-ethoxyethoxy)ethyl (meth)acrylate, 2-phenoxyethyl(meth)acrylate, ethoxylated nonyl phenol(meth)acrylates, (meth)acrylated monomers such as those described in U.S. Pat. No. 4,652,274, monomethoxy tripropylene glycol monoacrylate (available from Cognis Corporation under the designation PHOTOMER 8061), neopentylglycol propoxylate(2) methylether monoacrylate (available from Cognis Corporation under the designation PHOTOMER 8127), and the like.

Other suitable (meth)acrylate-functionalized monomers include carboxylic acid-functionalized ester-containing (meth)acrylate monomers, e.g., compounds containing at least one carboxylic acid group (—CO$_2$H), at least one ester linkage (in addition to at least one acrylate or methacrylate group) and at least one acrylate or methacrylate group per molecule. Such substances are well-known in the art and may be prepared using any suitable synthetic method. For example, one such method involves reacting a compound containing both a hydroxyl group and a (meth)acrylate group with an anhydride. Carboxylic acid-functionalized ester-containing (meth)acrylate monomers suitable for use in the present invention are available from commercial sources, including, for example, ECX 4046 from Cognis Corporation and the series of specialty oligomers sold by the Sartomer Company under the brand name SARBOX.

Suitable monomers having plural (meth)acrylate functionality (i.e., two or more (meth)acrylate groups per molecule) include, for example, 1,3-butylene glycol di(meth)acrylate, diethylene glycol di(meth)acrylate, 1,6-hexanediol di(meth)acrylate, neopentyl glycol di(meth)acrylate, triethylene glycol di(meth)acrylate, tetraethylene glycol di(meth)acrylate, dipropylene glycol di(meth)acrylate, tripropylene glycol di(meth)acrylate, trimethylol propane ethoxylate tri(meth)acrylate, pentaerythritol tetra(meth)acrylate, tripropylene glycol di(meth)acrylate, trimethylol propane tri(meth)acrylate, ethoxylated bisphenol A di(meth)acrylates, ethoxylated hexanediol di(meth)acrylates, tris(2-hydroxyethyl)isocyanurate tri(meth)acrylate, ditrimethylol propane tetra(meth)acrylate, dipentaerythritol penta(meth)acrylate, propoxylated glycerol tri(meth)acrylates, pentaerythritol tri(meth)acrylate, and the like. In one embodiment of the invention, the adhesive comprises one or more alkoxylated polyol poly(meth)acrylates containing at least three (meth)acrylate groups per molecule. The polyol may be an organic compound containing three or more hydroxyl groups per molecule, such as, for example, glycerin, dimethylolpropane, butanetriols, pentanetriols, trimethylolethane, trimethylolpropane, pentaerythritol, dipentaerythritol, sugar alcohols, or the like. The polyol is reacted with one or more alkylene oxides such as ethylene oxide or propylene oxide (typically, from about 1 to about 20 moles of alkylene oxide per mole of polyol) to form an alkoxylated polyol, then esterified with acrylic acid, methacrylic acid, or a derivative thereof to obtain the alkoxylated polyol poly(meth)acrylate.

Epoxy acrylates and epoxy methacrylates (particularly aliphatic epoxy (meth)acrylates) are also suitable for use in the present invention. Such compounds include, for example, di(meth)acrylate esters of alkanolglycidyl ether, wherein the alkanol has two or three hydroxy groups per molecule, such as the di(meth)acrylates of 1,4-butanedioldiglycidyl ether and tri(meth)acrylates of trimethylolpropanediglycidyl ether.

In one embodiment of the invention, at least a portion of the (meth)acrylate-functionalized monomers have two or more (meth)acrylate functional groups per molecule.

While the total concentration of (meth)acrylate-functionalized oligomers and monomers in the adhesives of the present invention is not thought to be particularly critical, it will generally be desirable to have present an amount of component b) which is effective to alter or improve at least one characteristic or property of the adhesive as compared to an adhesive not containing any such oligomer and/or monomer. Typically, component b) is present in an amount ranging from about 3 to about 25 percent by weight or from about 5 to about 20 percent by weight.

In preferred embodiments of the invention, the (meth)acrylate-functionalized oligomers and monomers are water-soluble or water-dispersible so as to provide good compatibility with the water-borne adhesive composition.

Other photopolymerizable monomers and/or oligomers may also be present in the adhesive composition in addition to the (meth)acrylate-functionalized oligomers and/or monomers.

The compositions of the present invention additionally contain at least one photoinitiator (component c) which may be employed alone or in combination with a photosensitizer. Suitable photoinitiators are any of those known to those skilled in the art for use with radiation or light (including visible and ultraviolet light) curable (meth)acrylate systems. Exemplary of such photoinitiators are acetophenone and its derivatives such as dichloroacetophenone, trichloroacetophenone, dialkoxyacetophenone, 2,2-dimethoxy-2-phenylacetophenone and 4-dialkylaminoacetophenone; benzophenone and its derivatives such as 4,4'-bis(dimethylamino) benzophenone (Michler's ketone) and 4,4'-bis(diethylamine) benzophenone; benzil; benzoin and its derivatives such as benzoin alkyl ether; benzildimethylketal; benzoylbenzoate; alphaacyloxime esters; thioxanthone and its derivatives such as 2-chlorothioxanthone and diethylthioxanthone; azo-compounds such as azobisisobutyronitrile; benzoyl peroxide; camphoquinone; phosphine oxides such as diphenyl-2,4,6-trimethylbenzoylphosphine oxide and the like. Especially preferred photoinitiators include aryl-substituted ketones and benzoyl-substituted phosphine oxides. Examples of commercially available photoinitiators suitable for use in the present invention include DAROCUR 1173, DAROCUR 4265, IRGACURE 2959, and IRGACURE 819. The precise concentration of photoinitiator(s) in the adhesive composition is not believed to be particularly critical, although a sufficient amount should be used to effectively accomplish curing of the (meth)acrylate-functionalized oligomers and monomers within the desired period of time upon exposing the adhesive composition to light radiation. Typically, photoinitiator concentrations of from about 0.1 to about 5 weight percent are utilized.

In addition to the foregoing constituents, the formulations of the present invention may further comprise one or more stabilizers, humectants, tackifiers, fillers, protective colloids, emulsifiers, surfactants, nonreactive diluents (solvents, especially water-soluble solvents, although in certain embodiments the adhesive is essentially free of solvents and other volatile substances other than water), adhesion promoters, defoamers, thickeners, thixotropic agents, coloring agents, plasticizers, antioxidants and the like.

The adhesive compositions of the present invention should be formulated so as to have viscosity properties suitable for the desired application. Typically, it will be desirable to adjust the viscosity to be relatively low at the temperature at which the adhesive is to be applied to the substrate so as to faciliate wetting of the substrate surface. When the adhesive composition is utilized in the manufacture of window-containing envelopes, for example, the application temperature is typically about 35 to about 45 degrees C. and the viscosity of the adhesive at 25 C is typically from about 900 cps to about 3000 cps.

Although the adhesive compositions of this invention are particularly suitable for use in the manufacture of envelopes, they may also be used in a wide variety of other bonding or joining applications such as, for example, packaging and bottle labeling, with numerous different substrates, provided that the uncured adhesive in the article of manufacture is capable of being exposed to UV and/or visible light radiation (i.e., at least one of the substrates must not entirely block such radiation) if curing of component b) of the adhesive is to be initiated after two substrates are joined with the adhesive therebetween. In some applications, it may be desirable to coat one substrate with a layer of the adhesive, expose the adhesive layer to light, and then join the adhesive-coated substrate to a second substrate while the adhesive layer is still wet and/or tacky. Suitable substrates include paper (including printed and/or coated paper), chipboard, paperboard, cardboard, boxboard (such as the types commonly used in the construction of folding cartons, for example), particle board, wood and other cellulosic substrates as well as textiles, leather, plastic sheets and films, metallized plastic films, glass, rubber, and metal sheets and foils.

Generally speaking, the adhesive may be applied to the substrates by any conventional coating technique typically used for waterborne emulsion adhesives, including mechanical coating, brushing, or spraying. A substrate bearing a layer of the coated adhesive may then be brought into face-to-face contact with a second substrate, which may or may not also have an adhesive layer coated thereon.

Suitable film materials for use in constructing an envelope containing a window using the adhesive compositions of the present invention include, for example, any of the materials known in the art to be useful in the fabrication of transparent or translucent envelope windows, including glassine, cellophane, cellulose acetate and polymers or plastics such as polyesters (e.g., polyethylene terephthalate), polyolefins (e.g., polyethylene, polypropylene), polyvinyl chloride, polyvinylidene chloride, polystyrene, and the like. Typically, the film material is thin (e.g., about 50 to about 1000 microns) and flexible. In one embodiment, the film material is essentially non-porous. The film may comprise one or more layers and may be treated or coated on one or both sides. For example, the film could be a coextruded multilayer film and could be flame- or corona-treated to improve adhesion to the cellulosic substrate.

For use in the manufacture of an article comprised of a substrate having an opening covered by a film (such as an envelope or a folding carton), the adhesive compositions of the present invention can be readily applied to the material comprising the main body of the substrate (typically comprising paper, boxboard or other cellulosic substrate) in the regions or areas desired (typically in a band around the perimeter of the opening in the main body of the substrate which will eventually form part of the substrate window) and/or to the film which will form the window patch (typically in a band around the outer edge of the window patch) by means of any conventional apparatus suitable for such purpose such as an envelope-making or folding carton-making apparatus. For example, a roller may be used to transfer the adhesive onto the film. Typically, the coating weight of the adhesive layer is adjusted to be sufficient to provide a cured adhesive layer of about 0.1 to about 2 mils in thickness. The window patch and the substrate material are then joined together with the adhesive layer therebetween. The laminate thereby formed may be pressed together (by nip rollers, for example).

The technology for fabricating envelopes containing transparent windows wherein the window is created by attaching a patch of a transparent film over an opening in the sheet material to be formed into an envelope is well known in the art and is described, for example, in the following United States patents, each of which is incorporated herein by reference in its entirety: U.S. Pat. Nos. 2,209,348; 2,986,976; 2,996,962; 3,400,641; 3,408,908; 3,412,655; 3,416,414; 3,431,830; 3,468,227; 3,572,222; 3,618,483; 3,630,124; 3,869,965; 3,745,893; 4,061,527; 4,642,085; 4,838,982; and 5,640,831.

Similarly, methods of manufacturing folding cartons or boxes containing transparent windows wherein the window is formed by affixing a transparent film over an opening in the boxboard material used for such carton or box is also well known in the art, as described for example in the following United States patents, each of which is incorporated herein by reference in its entirety: U.S. Pat. Nos. 4,826,004; 4,846,775; 4,733,916; 5,160,083; 3,292,513; 3,273,702, and 4,664,648.

Curing of the adhesive composition of the present invention may be accomplished by at least two mechanisms. One type of cure takes place as a result of drying the adhesive, i.e., removing water and other volatile substances (if any) from the adhesive. This type of cure is the result of evaporation/coalescence whereby, as the water evaporates from the system, the emulsified particles of the vinyl ester polymer come closer and closer together until they touch and coalesce together, forming a continuous film. Another type of cure takes place as a result of the interaction of the photoinitiator and the (meth)acrylate-functionized monomers and/or oligomers when the adhesive is exposed to UV or visible light. The light radiation generates free radicals (for example, from the photoinitiator), which initiate free-radical polymerization through the ethylenically unsaturated double bonds of the monomers and oligomers.

In general, curing of the adhesive composition is carried out near ambient (room) temperatures, e.g., from about 20 to about 35 degrees C., although drying of the vinyl ester polymer emulsion component can be accelerated by applying heat and/or circulating/blowing air. An advantage of the adhesive composition of the present invention is that heating of the adhesive to an elevated temperature for the purpose of inducing a crosslinking reaction is not necessary. The radiation source used to cure component b) of the adhesive may be any of the devices known or used in the art to cure light-curable adhesive compositions. The wavelength of the light is selected depending upon the types of photoinitiator(s) and (meth)acrylate-functionalized oligomers and monomers present in the adhesive composition. In one embodiment of the invention, however, where the adhesive is curable by means of visible light, the light-emitting source may be a light emitting diode (LED) or array of LEDs. Such devices are advantageous since they may be readily scaled to the particular application, emit little or no heat, do not require costly replacement parts, and have relatively low maintenance costs. When the adhesive is cured using UV (ultraviolet) light, such light may be generated from low, medium and/or high pressure mercury lamps, He—Cd and Ar lasers, Xenon arc lamps, low intensity fluorescent lamps or other suitable source. The UV light may have a wavelength of from about 200 to about 450 nanometers. The energy radiated may, for example, be from about 200 mJ/cm$^2$ to about 2000 mJ/cm$^2$ of irradiated area.

EXAMPLE 1

Example 1 illustrates a one component dual curable waterborne laminating adhesive in accordance with the invention which is useful for forming a two layer structure (preferably paper to film) and which has a suitable viscosity for such application. The adhesive was prepared by combining the following components.

| Component | Weight % | Source |
| --- | --- | --- |
| 56-1081MUV[1] | 90 | Henkel |
| PHOTOMER 4158[2] | 7.6 | Cognis |
| SR 494[3] | 2 | Sartomer |
| IRGACURE 2959[4] | 0.4 | Ciba |

[1]vinyl acetate polymer emulsion (64% solids)
[2]ethoxylated (14) trimethylolpropane triacrylate
[3]ethoxylated (5) pentaerythritol tetraacrylate
[4]1-[4-(2-hydroxyethoxy)-phenyl]-2-hydroxy-2-methyl-propane-1-one (photoinitiator)

The adhesive was separately applied to both printed paper and un-printed paper and a second layer of film was placed over the wet adhesive on the paper. The adhesive was cured by UV exposure through the film with a 300 w/in medium pressure mercury arc lamp, using an H bulb at 100% power and 200 ft/min conveyor speed. The bond strengths of the laminates thereby produced were determined by a T-peel test in a T-peel settings at 12 inches per minute on one inch wide strips.

The following results were obtained:

| Type of Laminate Structure | Bond Strength (lb) |
| --- | --- |
| Printed Paper/Film | 0.26 (peel) |
| Unprinted Paper/Film | 1.11 (stock tear) |

EXAMPLE 2

This example illustrates another dual curable waterborne laminating adhesive in accordance with the present invention. The following components were combined:

| Component | Weight % | Source |
| --- | --- | --- |
| 56-1123UV[1] | 88 | Henkel |
| PHOTOMER 4158[2] | 6 | Cognis |
| SR 399[3] | 3 | Sartomer |
| IRGACURE 2959[4] | 1 | Ciba |
| HMMP[5] | 2 | Ciba |

[1]polyvinyl acetate emulsion
[2]ethoxylated (14) trimethylolpropane triacrylate
[3]dipentaerythritol pentaacrylate
[4]1-[4-(2-hydroxyethoxy)-phenyl]-2-hydroxy-2-methyl-1-propan-1-one (photoinitiator)
[5]2-hydroxy-2-methyl-1-phenyl-propan-1-one (photoinitiator)

The adhesive was applied to samples of both printed and unprinted paper and a second layer of film was placed over the wet adhesive on each paper sample. The adhesive was cured by exposing the adhesive through the film to UV radiation which was generated using a 300 w/in medium pressure mercury arc lamp, an H bulb at 100% power and 200 ft/min conveyor speed. The bond strengths of the laminates were determined by a T-peel test in a T-peel setting at 12 inches per minute on one inch wide strips. The following results were obtained:

| Laminate Structure | Bond Strength (lb) |
|---|---|
| Printed Paper/Film | 0.69 (fiber tear) |
| Unprinted Paper/Film | 0.75 (fiber tear) |

EXAMPLES 3 and 4

These examples demonstrate waterborne dual curable adhesive which are useful for laminating multiple substrates, especially paper to film, and which exhibit high immediate green tack when cured using visible light radiation. The following components were combined:

EXAMPLE 3

| Component | Weight % | Source |
|---|---|---|
| 56-1081MUV[1] | 88 | Henkel |
| PHOTOMER 4158[2] | 6.4 | Cognis |
| LOCTITE 3321[3] | 3.2 | Henkel |
| DAROCUR 4265[4] | 1.6 | Ciba |
| 2,2-Dimethoxy-2-phenylacetophenone | 0.6 | Aldrich |

EXAMPLE 4

| Component | Weight % | Source |
|---|---|---|
| 56-1123UV[1] | 88 | Henkel |
| PHOTOMER 4158[2] | 6 | Cognis |
| LOCTITE 3321[3] | 3 | Henkel |
| 2,2-Dimethoxy-2-phenylacetophenone | 1 | Aldrich |
| DAROCUR 4265[4] | 2 | Ciba |

[1]vinyl acetate polymer emulsion
[2]ethoxylated (14) trimethylolpropane triacrylate
[3]"acrylated urethane" formulation also containing (meth)acrylate-functionalized monomer and photoinitiator
[4]mixture of 2,4,6-trimethylbenzoyl-diphenyl-phosphine oxide and 2-hydroxy-2-methyl-1-phenyl-propan-1-one (photoinitiator)

The adhesives were applied to unprinted paper and a second layer of film was placed over the wet adhesive layer on the paper. The adhesives were cured through the film by visible light radiation generated by a LOCTITE 7740 LED lamp. The bond strengths of the laminates were determined by a T-peel test in T-peel settings at 12 inches per minute on one inch wide strips. The following results were obtained:

| | Bond Strength (lb) | | |
|---|---|---|---|
| Formula | After 12 Minutes | After 30 Minutes | After 60 Minutes |
| Example 3 | 0.38 (fiber tear) | 0.39 (fiber tear) | 0.28 (peel) |
| Example 4 | 0.17 (fiber tear) | 0.42 (fiber tear) | 0.43 (fiber tear) |

EXAMPLES 5 and 6

Examples 5 and 6 demonstrate dual curable laminating adhesives that exhibit improved immediate green tack as compared to the adhesive of Example 3. The following components were combined:

EXAMPLE 5

| Component | Weight % | Source |
|---|---|---|
| 56-1123UV[1] | 85 | Henkel |
| LOCTITE 3321[2] | 15 | Henkel |

EXAMPLE 6

| Component | Weight % | Source |
|---|---|---|
| 56-1081MUV[1] | 90 | Henkel |
| LOCTITE 3321[2] | 10 | Henkel |

[1]vinyl acetate polymer emulsion
[2]"acrylated urethane" formulation also containing (meth)acrylate-functionalized monomer and photoinitiator The adhesives were applied to samples of both printed and unprinted paper and a second layer of film was placed over the wet adhesive layer on each paper sample. The adhesives were cured through the film by UV and visible light radiation using a LOCTITE 7740 UV wand system. The bond strengths of the laminates were determined by a T-peel test in T-peel settings at 12 inches per minute on one inch wide strips. The following results were obtained:

| | | Bond Strength (lb) | | |
|---|---|---|---|---|
| Formula | Structure | <5 Minutes | 30 Minutes | 60 Minutes |
| Example 5 | Unprinted Paper/Film | 0.25 (fiber tear) | 0.68 (fiber tear) | 0.94 (stock tear) |
| Example 6 | Unprinted Paper/Film | 0.26 (fiber tear) | 0.68 (stock tear) | 0.99 (stock tear) |
| | Printed Paper/Film | 0.54 (fiber tear) | 0.51 (stock tear) | 1.05 (stock tear) |

EXAMPLE 7

This example illustrates a waterborne dual curable adhesive in accordance with the invention which is useful for forming multiple layer laminates, preferably where paper is laminated to film, and which exhibits high green tack bonds. The following components were combined:

| Component | Weight % | Source |
|---|---|---|
| 56-1081MUV[1] | 90 | Henkel |
| LOCTITE 3321[2] | 9 | Henkel |
| 2,2-Dimethoxy-2-phenylacetophenone | 1 | Aldrich |

[1]vinyl acetate polymer emulsion
[2]"acrylated urethane" formulation also containing (meth)acrylate-functionalized monomer and photoinitiator The adhesive was applied to both printed and unprinted paper samples and a second layer of film was placed over the wet adhesive on the paper samples. The adhesive was cured through the film by exposing the adhesive to UV and visible light generated by a LOCTITE 7740 UV wand system (having a high pressure mercury arc lamp with universal power supply and liquid-filled light wand and output of up to 10 W/cm$^2$, available from Henkel Corporation). The bond strengths of the laminates were determined by a T-peel test in T-peel settings at 12 inches per minute on one inch wide strips. The following results were obtained:

| Structure | Bond Strength (lb) | | |
| --- | --- | --- | --- |
| | <5 Minutes | 30 Minutes | 60 Minutes |
| Unprinted Paper/Film | 0.52 (fiber tear) | 1.01 (stock tear) | 0.75 (stock tear) |
| Printed Paper/Film | 0.58 (fiber tear) | 0.47 (fiber tear) | 0.58 (fiber tear) |

EXAMPLE 8 (COMPARATIVE)

This example demonstrates the bonding properties that can be achieved using a conventional waterborne laminating adhesive to attach a film to a boxboard substrate. The adhesive (Henkel 56-5528) was applied to boxboard and a layer of film placed over the wet adhesive layer. The boxboard/film laminate was nipped and then cured at room temperature. The bond strength of the laminate was determined by a T-peel test using T-peel settings at 12 inches per minute on one inch wide strips. The following results were obtained:

| | |
| --- | --- |
| Bond strength after 2 minutes: | 0.3 lb (peel) |
| Bond strength after 5 minutes: | 0.4 lb (peel) |
| Bond strength after 20 minutes: | 0.35 lb (peel) |
| Bond strength after 1 hour: | 0.44 lb (100% fiber tear) |
| Bond strength after 24 hours: | 0.49 lb (100% fiber tear) |

EXAMPLE 9

This example illustrates a waterborne dual curable adhesive in accordance with the invention which is useful for forming multiple layer laminates, preferably where boxboard is laminated to film, and which exhibits high green tack bonds. The following components were combined:

| Component | Weight % | Source |
| --- | --- | --- |
| 56-1123UV[1] | 86 | Henkel |
| LOCTITE 3321[2] | 2 | Henkel |
| PHOTOMER 4158[3] | 6 | Cognis |
| SR 399[4] | 3 | Sartomer |
| IRGACURE 2959[5] | 1 | Ciba |
| HMMP[6] | 2 | Ciba |

[1]polyvinyl acetate emulsion
[2]"acrylated" urethane" formulation also containing (meth)acrylate-functionalized monomer and photoinitiator
[3]ethoxylated (14) trimethylolpropane triacrylate
[4]dipentaerythritol pentaacrylate
[5]1-[4-(2-hydroxyethoxy)-phenyl]-2-hydroxy-2-methyl-1-propan-1-one (photoinitiator)
[6]2-hydroxy-2-methyl-1-phenyl-propan-1-one (photoinitiator)

The adhesive was applied to samples of boxboard and a second layer of film was placed over the wet adhesive on each boxboard sample. The adhesive was cured by exposing the adhesive through the film to UV radiation which was generated using a 300 w/in medium pressure mercury arc lamp, an H bulb at 100% power and 200 ft/min conveyor speed. The bond strengths of the laminates were determined by a T-peel test in a T-peel setting at 12 inches per minute on one inch wide strips. The following results were obtained:

| | |
| --- | --- |
| Bond strength after 5 minutes: | 0.41 lb (peel w/5% fiber tear)) |
| Bond strength after 30 minutes: | 0.66 lb (peel w/50% fiber tear) |
| Bond strength after 1 hour: | 1.19 lb (peel w/100% fiber tear) |
| Bond strength after 24 hours: | 1.33 lb (peel w/100% fiber tear) |

The dual curable adhesive employed in Example 9 thus exhibited a significantly higher green tack than the conventional adhesive utilized in Example 8.

EXAMPLE 10

This example illustrates a waterborne dual curable adhesive in accordance with the invention which is useful for forming multiple layer laminates, preferably where boxboard is laminated to film, and which exhibits high green tack bonds. The following components were combined:

| Component | Weight % | Source |
| --- | --- | --- |
| 56-1081MUV[1] | 88 | Henkel |
| LOCTITE 3321[2] | 1.4 | Henkel |
| PHOTOMER 4158[3] | 6 | Cognis |
| SR 494[4] | 4 | Sartomer |
| IRGACURE 2959[5] | 0.6 | Ciba |

[1]polyvinyl acetate polymer emulsion (64% solids)
[2]"acrylated" urethane" formulation also containing (meth)acrylate-functionalized monomer and photoinitiator
[3]ethoxylated (14) trimethylolpropane triacrylate
[4]1-[4-(2-hydroxyethoxy)-phenyl]-2-hydroxy-2-methyl-1-propan-1-one (photoinitiator)

The adhesive was applied to samples of boxboard and a second layer of film was placed over the wet adhesive on each boxboard sample. The adhesive was cured by exposing the adhesive through the film to UV radiation which was generated using a 300 w/in medium pressure mercury arc lamp, an H bulb at 100% power and 200 ft/min conveyor speed. The bond strengths of the laminates were determined by a T-peel test in a T-peel setting at 12 inches per minute on one inch wide strips. The following results were obtained:

| | |
| --- | --- |
| Bond strength after 5 minutes: | 0.53 lb (peel w/50% fiber tear)) |
| Bond strength after 30 minutes: | 0.93 lb (peel w/100% fiber tear) |
| Bond strength after 1 hour: | 1.6 lb (peel w/100% fiber tear) |
| Bond strength after 24 hours: | 1.4 lb (peel w/100% fiber tear) |

The dual curable adhesive employed in Example 10 thus exhibited a significantly higher green tack than the conventional adhesive utilized in Example 8 and a higher immediate green tack than the adhesive utilized in Example 9.

EXAMPLES 11 and 12

Example 10 was repeated, except that the adhesive in the boxboard/film laminate was cured by visible light radiation using an LED lamp (LOCTITE 7740 UV Wand System). For comparison, the adhesive was also cured under the conditions of Example 10 (UV light). The following results were obtained:

| | | |
|---|---|---|
| Bond strength (2 min.): | 0.68 lb (peel w/50% FT) | 1.1 lb (peel w/20% FT) |
| Bond strength (10 min.): | 0.5 lb (peel w/100% FT) | 1.2 lb (peel w/70% FT) |

FT = fiber tear

These results demonstrate that if visible light radiation is used to cure the adhesive, higher instantaneous green tack is obtained as compared to when ultraviolet light curing is utilized.

EXAMPLE 13

This example illustrates a waterborne dual curable adhesive in accordance with the invention which is useful for forming multiple layer laminates, preferably where boxboard is laminated to film, and which exhibits high green tack bonds. The following components were combined:

| Component | Weight % | Source |
|---|---|---|
| 56-6181UV[1] | 88 | Henkel |
| LOCTITE 3321[2] | 1.4 | Henkel |
| PHOTOMER 4158[3] | 6 | Cognis |
| SR 494[4] | 4 | Sartomer |
| IRGACURE 2959[5] | 0.6 | Ciba |

[1] polyvinyl acetate polymer emulsion (64% solids)
[2] "acrylated" urethane" formulation also containing (meth)acrylate-functionalized monomer and photoinitiator
[3] ethoxylated (14) trimethylolpropane triacrylate
[4] 1-[4-(2-hydroxyethoxy)-phenyl]-2-hydroxy-2-methyl-1-propan-1-one (photoinitiator)

The adhesive was applied to samples of boxboard and a second layer of film was placed over the wet adhesive on each boxboard sample. The adhesive was cured by exposing the adhesive through the film to UV radiation which was generated using a 300 w/in medium pressure mercury arc lamp, an H bulb at 100% power and 200 ft/min conveyor speed. The bond strengths of the laminates were determined by a T-peel test in a T-peel setting at 12 inches per minute on one inch wide strips. The following results were obtained:

| | |
|---|---|
| Bond strength after 2 minutes: | 0.19 lb (peel w/30% fiber tear)) |
| Bond strength after 10 minutes: | 0.24 lb (peel w/100% fiber tear) |
| Bond strength after 30 minutes: | 0.42 lb (peel w/100% fiber tear) |
| Bond strength after 4 hours: | 0.57 lb (peel w/100% fiber tear) |

What is claimed is:

1. A dual cure adhesive comprising:
   a) a water-based emulsion of at least one of i) a vinyl ester homopolymer, ii) a copolymer consisting of two or more vinyl ester monomers or ii) a copolymer consisting of at least one vinyl ester monomer and at least one comonomer selected from the group consisting of alpha olefins, C1-C9 esters of mono- and dicarboxylic acids containing at least one carbon-carbon double bond, N-methylolacrylamide, N-vinyl formamide, and N-vinyl pyrrolidone;
   b) at least one (meth)acrylate-functionalized monomer and/or oligomer capable of being polymerized and/or crosslinked by exposure to ultraviolet or visible light; and
   c) at least one photoinitiatord
   wherein said water-based emulsion is cured by evaporation/coalescence.

2. The dual cure adhesive of claim 1, wherein component a) comprises from about 70 to about 95 percent by weight of the dual cure adhesive.

3. The dual cure adhesive of claim 1, comprising at least one (meth)acrylate-functionalized urethane oligomer.

4. The dual cure adhesive of claim 1, comprising at least one ethoxylated polyol poly(meth)acrylate containing at least three (meth)acrylate groups per molecule.

5. The dual cure adhesive of claim 1, comprising at least one vinyl acetate homopolymer.

6. The dual cure adhesive of claim 1, wherein component a) has a solids content of from about 50 to about 80% by weight.

7. The dual cure adhesive of claim 1, wherein component b) comprises from about 5 to about 20% by weight of said dual cure adhesive.

8. The dual cure adhesive of claim 1, wherein said dual cure adhesive has a viscosity of from about 900 to about 3000 cps at 25 degrees C.

9. The dual cure adhesive of claim 1, additionally comprising at least one additive selected from the group consisting of plasticizers, fillers, thickeners, thixotropic agents, surfactants, emulsifiers, protective colloids, humectants, stabilizers, tackifiers, and dispersants.

10. The dual cure adhesive of claim 1, wherein component c) comprises from about 0.1 to about 5 percent by weight of said dual cure adhesive.

11. The dual cure adhesive of claim 1, wherein said at least one (methlacrylate-functionalized monomer and/or oligomer is water-soluble.

12. A method of bonding a first substrate to a second substrate, said method comprising forming a laminate of said first substrate and said second substrate with a layer of the dual cure adhesive of claim 1 therebetween and then exposing said layer of the dual cure adhesive to at least one of ultraviolet or visible light.

13. The method of claim 12, wherein said first substrate is cellulosic and said second substrate is a film which is transparent to at least one of ultraviolet or visible light.

14. The method of claim 12, wherein visible light is used to cure the layer of the dual cure adhesive and a light-emitting diode or array of light-emitting diodes is used as a source of the visible light.

15. The method of claim 12, additionally comprising a step of drying said layer of said dual cure adhesive.

16. A method of making an article comprised of a cellulosic substrate having an opening therein and a film covering said opening, said method comprising forming a laminate of said cellulosic substrate and said substrate with a layer of the dual cure adhesive of claim 1 therebetween around at least a portion of the perimeter of said opening and then exposing said layer of said dual cure adhesive to at least one of ultraviolet or visible light.

* * * * *